(12) United States Patent
Direkwut

(10) Patent No.: US 10,048,077 B2
(45) Date of Patent: Aug. 14, 2018

(54) METHOD AND SYSTEM OF GENERATING AN INDOOR FLOOR PLAN

(71) Applicant: Pornchai Direkwut, Nonthaburi (TH)

(72) Inventor: Pornchai Direkwut, Nonthaburi (TH)

( * ) Notice: Subject to any disclaimer, the term of this patent is extended or adjusted under 35 U.S.C. 154(b) by 709 days.

(21) Appl. No.: 14/552,372

(22) Filed: Nov. 24, 2014

(65) Prior Publication Data

US 2016/0148422 A1    May 26, 2016

(51) Int. Cl.
*G06F 1/00* (2006.01)
*G01C 21/32* (2006.01)
*G01C 21/20* (2006.01)

(52) U.S. Cl.
CPC ........... *G01C 21/32* (2013.01); *G01C 21/206* (2013.01)

(58) Field of Classification Search
CPC . G06F 1/00; G06T 17/05; G06T 19/20; G06F 3/0484; G01C 21/00
See application file for complete search history.

(56) References Cited

U.S. PATENT DOCUMENTS

| 6,675,091 | B2 | 1/2004 | Navab |
| 7,134,088 | B2 | 11/2006 | Larsen |
| 7,979,079 | B2 | 7/2011 | Dishongh |
| 7,996,281 | B2 | 8/2011 | Alverez et al. |
| 8,204,515 | B2 | 6/2012 | Dishongh |
| 2014/0002444 | A1* | 1/2014 | Bennett ................... G06F 3/012 345/419 |
| 2014/0164921 | A1* | 6/2014 | Salinas ............. G06F 17/30241 715/716 |

* cited by examiner

*Primary Examiner* — Michael Faragalla
(74) *Attorney, Agent, or Firm* — Delphine James

(57) ABSTRACT

The system includes a method of mapping a building indoor floor plan onto a physical map projection and provides a visual depiction thereof. The system and method is implemented in a computer system wherein each floor of a building is visually mapped from its relative (x, y) position into its real world (x, y) position.

12 Claims, 14 Drawing Sheets

Building Q
Elevator Floor Plan
Relative Coordinates

Elevator Floor Plan
Real Coordinates

Layers On System

| Building Element Location Relative Table |||
| --- | --- | --- |
| X | Y | Label |
| 1 | 1000 | R1 |
| 2 | 1001 | R2 |
| 3 | 1003 | R3 |
| 252'-015116 | 417'-2/38" | ACB1.1278 |

Figure 13

| Building Element Location Real World Table | | Shapefile |
|---|---|---|
| Longitude | Latitude | Label |
| 1234 | 3456 | R1, |
| 5678 | 91011 | R2, |
| | | R3, |
| 3111093 | 13821672 | ACB1.1278 |

Figure 14

METHOD AND SYSTEM OF GENERATING AN INDOOR FLOOR PLAN

BACKGROUND OF THE INVENTION

This invention relates to a method of generating the actual longitude and latitude position of a building infrastructure. Emergency response operations in complex buildings require knowledge of the internal infrastructure of a buildings floor plan. This allows emergency personnel to plan the best routes to handle the emergency within a particular building. Complex buildings normally have updated floor plans, but the ability to easily locate a particular unit on a particular floor in a building efficiently helps emergency personnel create efficient routes. Thus, a need exists to generate a mapping of a building internal infra-structure to actual real world mapping coordinates.

SUMMARY OF THE INVENTION

One of the main objectives of the present invention is to efficiently create a mapping of longitude and latitude of each unit in a building. The system includes a method of mapping a building floor plan onto a physical map projection and provides a visual depiction thereof. The system and method is implemented in a computer system wherein each floor of a building is visually mapped from its relative (x, y) position into its real world (x, y) position.

The above and other objects, features and advantages of the present invention should become even more readily apparent to those skilled in the art upon a read in of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 13 illustrates a representation of the table from CAD output.

FIG. 14 illustrates a representation of the table from GIS output.

DETAILED DESCRIPTION OF THE INVENTION

Figure 6:
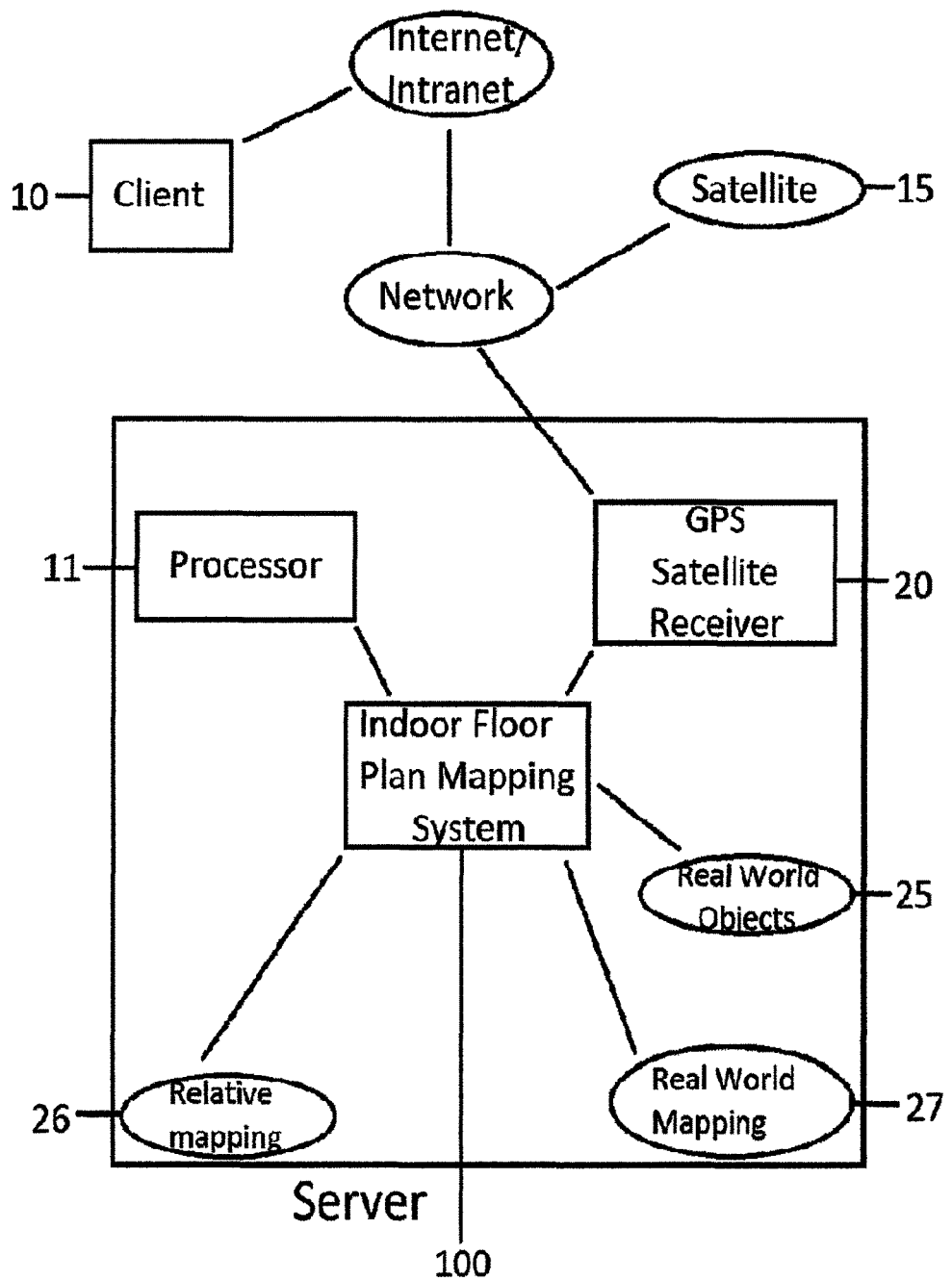
FIG. 6 illustrates the block diagram of the computer implemented system.

The present invention is a computer implemented method and system of mapping a building floor plan onto its actual longitude and latitude location on the earth surface designated as reference 100. The present invention can be implemented in a client/server environment or on a stand-alone computer system. As depicted in FIG. 6, a user can access the mapping system (100) through the network or the internet/intranet through a client computer (10). The system comprises a server computer with a processor (11) programmed to implement the mapping system (100) which interfaces with satellite (15) to receive longitude and latitude information through a GPS satellite receiver (20) that is imported into a real world objects database (25). The mapping system (100) comprises generating a representation of an indoor floor plan based upon relative data mapping data objects (26) and generating a real world mapping to actual longitude and latitude points (27) based upon the relative mapping data objects (26) utilizing the data captured by the real world objects database (25).

As depicted in FIG. 6, each real world object on the earth is represented as a longitude and latitude position that can be stored as data objects (25) in a table or in a real world objects database (25). Referring to FIG. 6, in the system, real world data objects (25) such as roads, land use, elevation, trees and buildings are represented as longitude and latitude digital data objects. In one embodiment of the system, a satellite (15) is utilized to survey real world object of the earth surface. The satellite (15) captures, collects and stores the earth surface information and transmits that information to system stored as digital data objects in database (25). For example data collected by the global positioning system receiver (20) can be imported and stored as data objects in database (25). Utilizing the captured real world data objects in database (20), the system (100) generates real world mapping (27) (i.e. longitudinal and latitude position) location of each desired element of an indoor floor plan structure utilizing relative world mapping (26).

Map projection is the systematic transformation of latitudes and longitudes locations on the surface of the earth based upon an object longitude and latitude position. Latitude in geography represents a geographic coordinate that specifies north-south position of a point on the earth's surface. Lines of latitude runs parallel to the equator and ranges between 0 to 90 degrees north or south at the poles. Longitude in geography represents a geographic coordinate that specifies east-west position of a point on the earth's surface. Lines of longitude runs perpendicular to the equator and ranges between 0 to 90 degrees north or south at the poles. Lines of latitude are used in conjunction with longitude to create a precise location on the surface of the earth.

Figure 5:
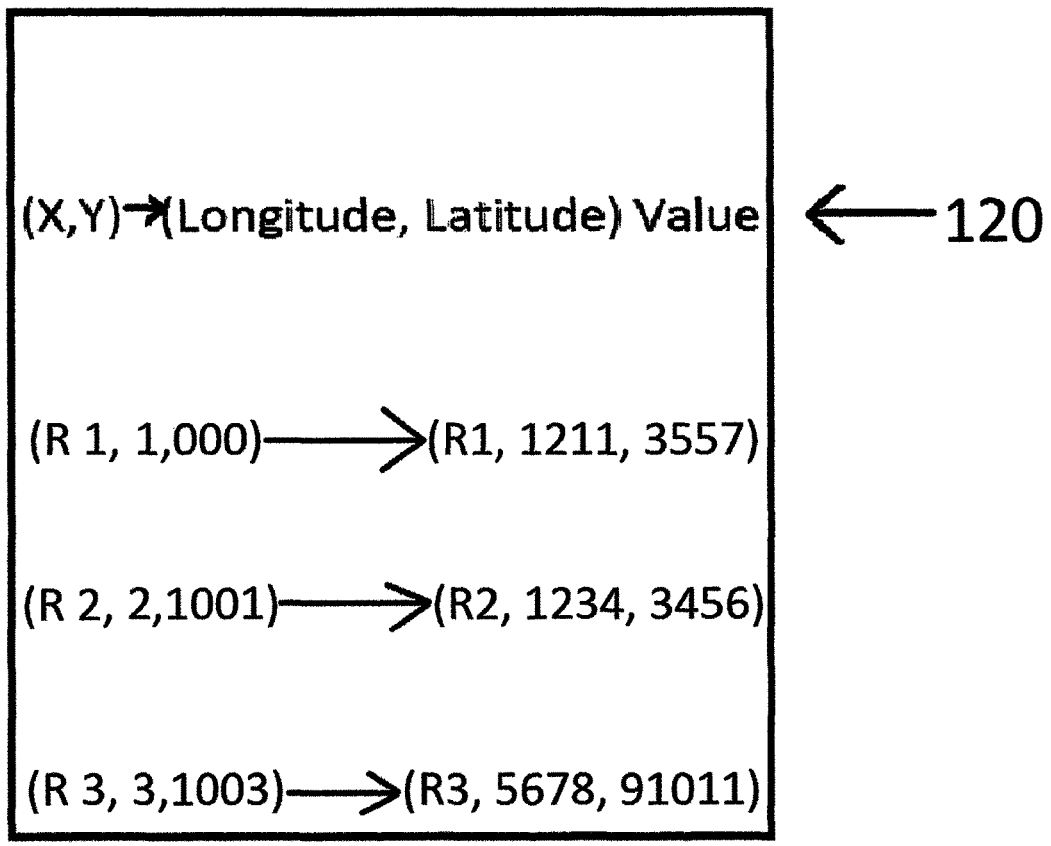
FIG. 5 illustrates floor plan with real longitude and latitude position for units.

As shown in FIGS. 5 and 6, the system (100) generates for each relative mapping (26) of each desired element of the indoor floor plan building structure a mapping element onto a longitude and latitude position in real world mapping (27). For example, table 120 in FIG. 5 depicts an example of an elevator floor plan mapping. Elevator Unit labelled as R1 with relative position (x-1, y1000) in relative table (26)

maps to (longitude-1211, latitude-3557) in real world (27). This is the final mapping that the system (100) produces to be placed into a shapefile.

Figure 4:
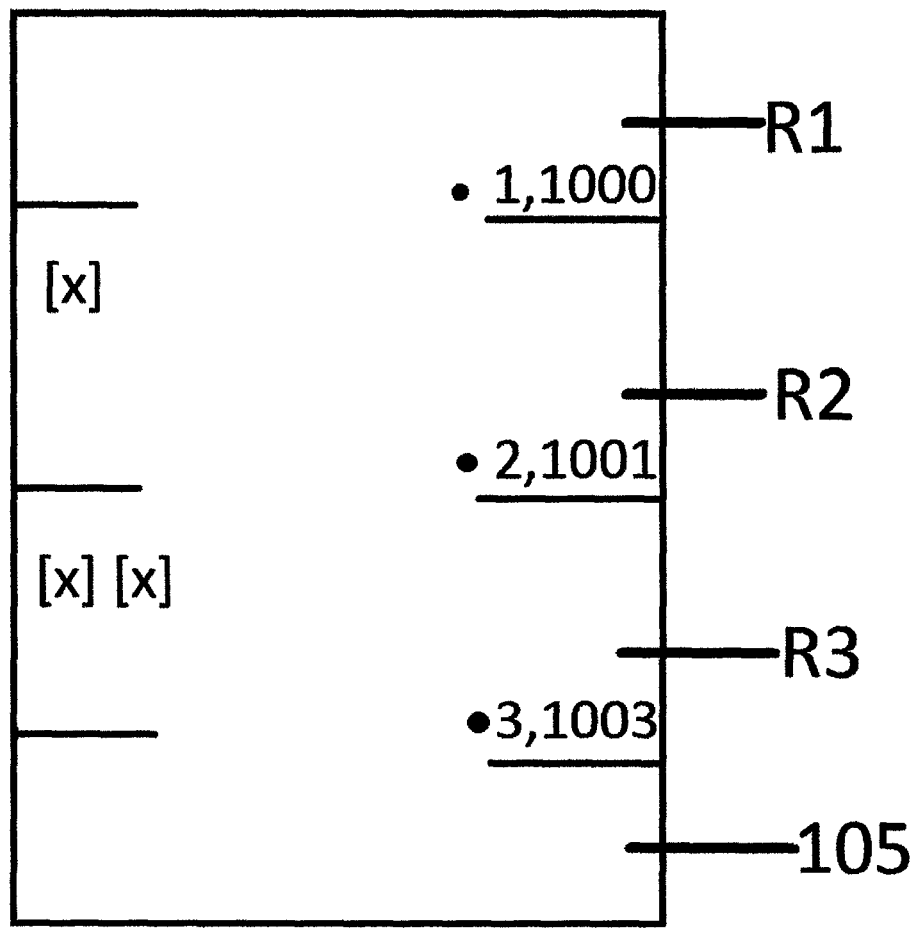
FIG. 4 illustrates floor plan with relative x and y coordinates for units.
Figure 9:
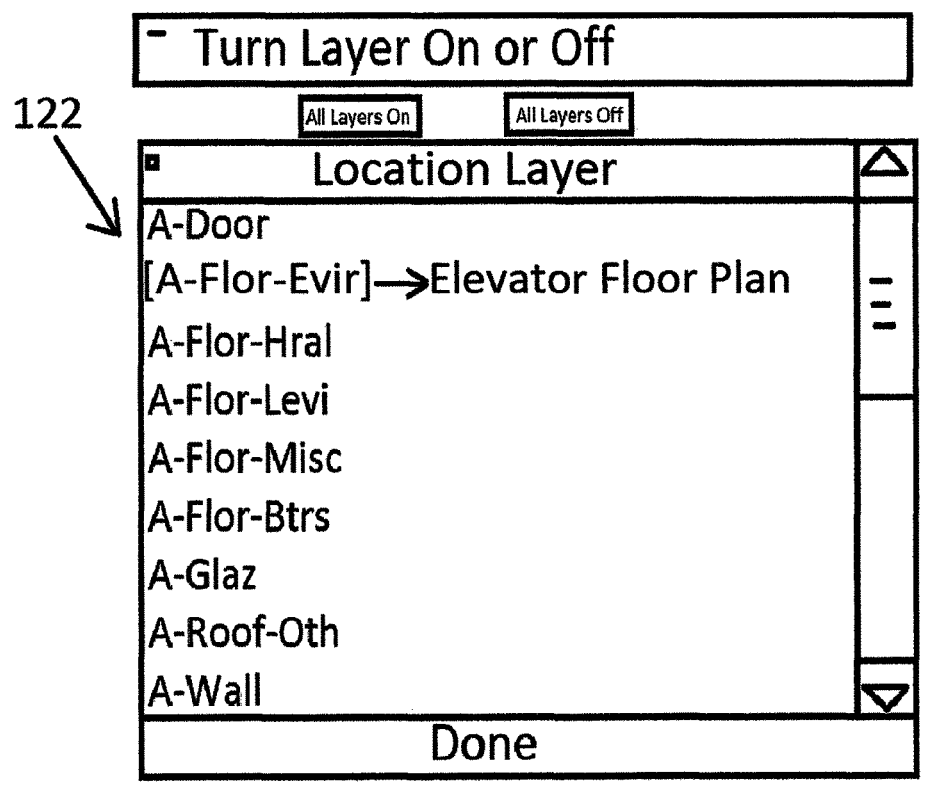
FIG. 9 illustrates an example of the display for the CAD software.

In this example a user from computer display (122) in FIG. 9 selects a desired element layer [i.e. A-Flor-Evir] which displays FIG. 4 through CAD software. A location layer is created for element layer [i.e. A-Flor-Evir]. In the location layer each elevator unit label as R1, R2, and R3 respectively are represented by dots. As shown the location of each elevator unit has a relative (x,y) position in table 105. After FIG. 4 is mapped to real world FIG. 5 is generated by the system showing the real world longitude and latitude location for each elevator unit label.

First, the system is used to create a three dimensional top view of digital representation of a building floor plan (105) as depicted in FIG. 4. With the system, a digital representation of each floor in a building is generated. Each floor has elements including but not limited to doors, elevators, fire extinguishers, camera, fire escapes, mechanical rooms, and living space rooms. Each floor is generated in layers of objects as shown in FIG. 9. A user selects an element on a floor. For example, FIG. 9 represents a digital representation of elements in the Building Q. A user selects elevator layer, A-Flor-Evir. A location layer is created for A-Flor-Evir. FIG. 4 provides the (x, y) relative mapping for each location of elevator unit on a specific floor.

Figure 7:
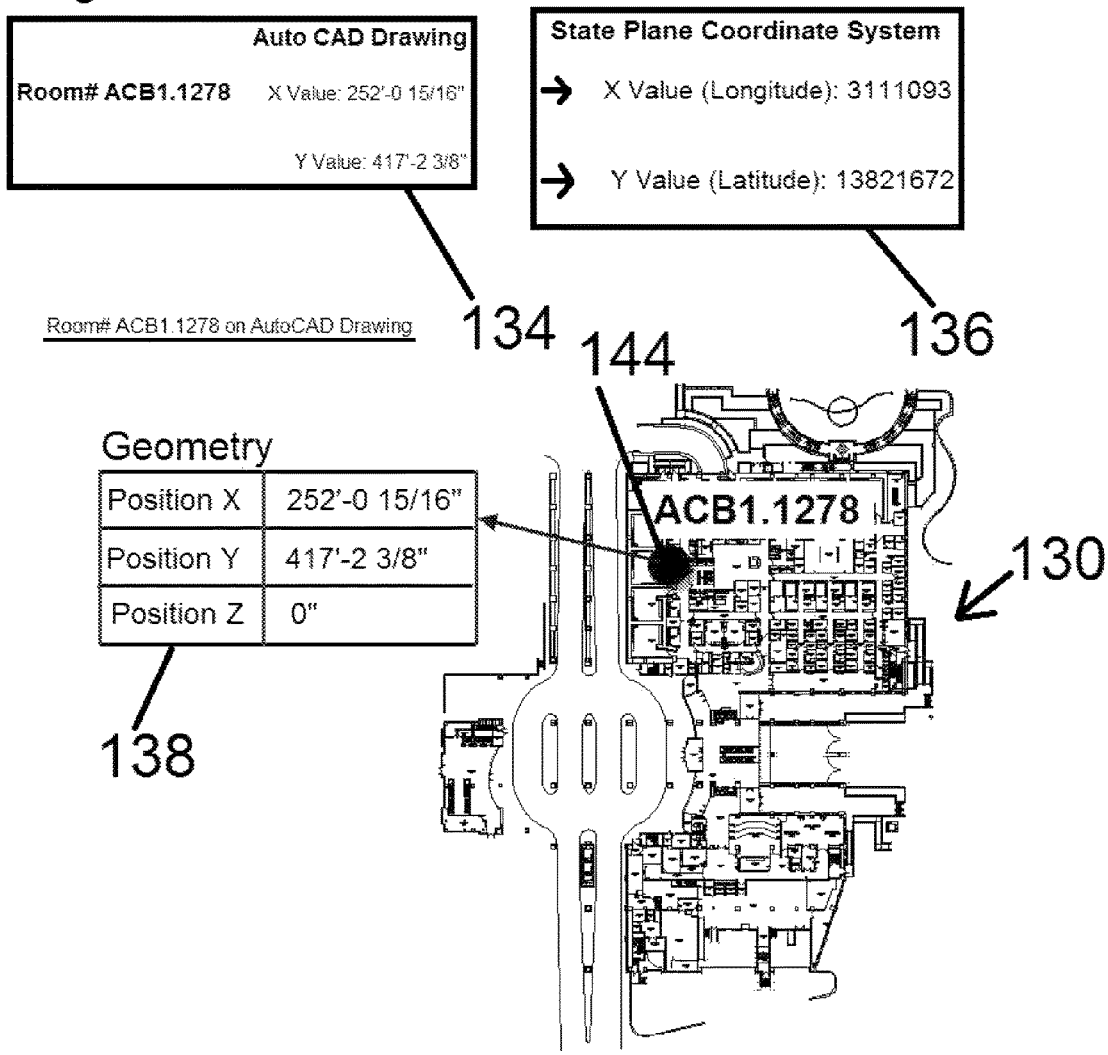
FIG. 7 illustrates an example of an Indoor Floor Plan
Figure 10:
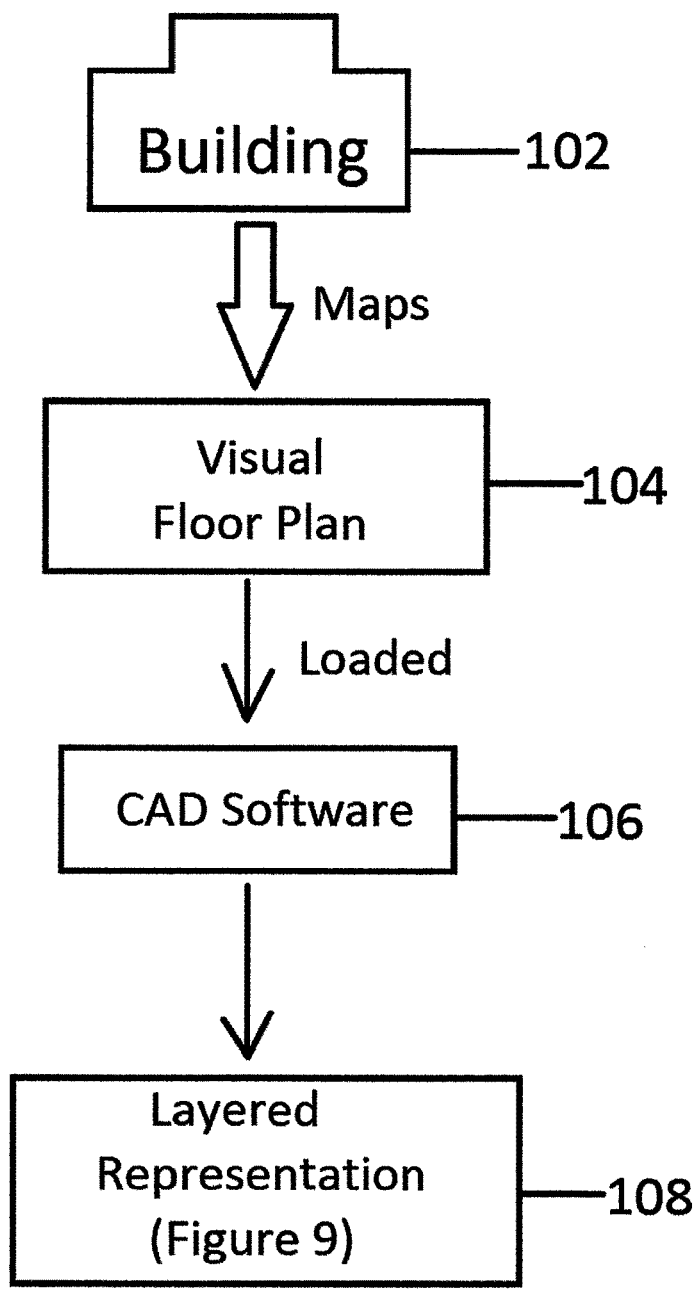
FIG. 10 illustrates a block diagram of the overall software data flow from CAD.
Figure 11:
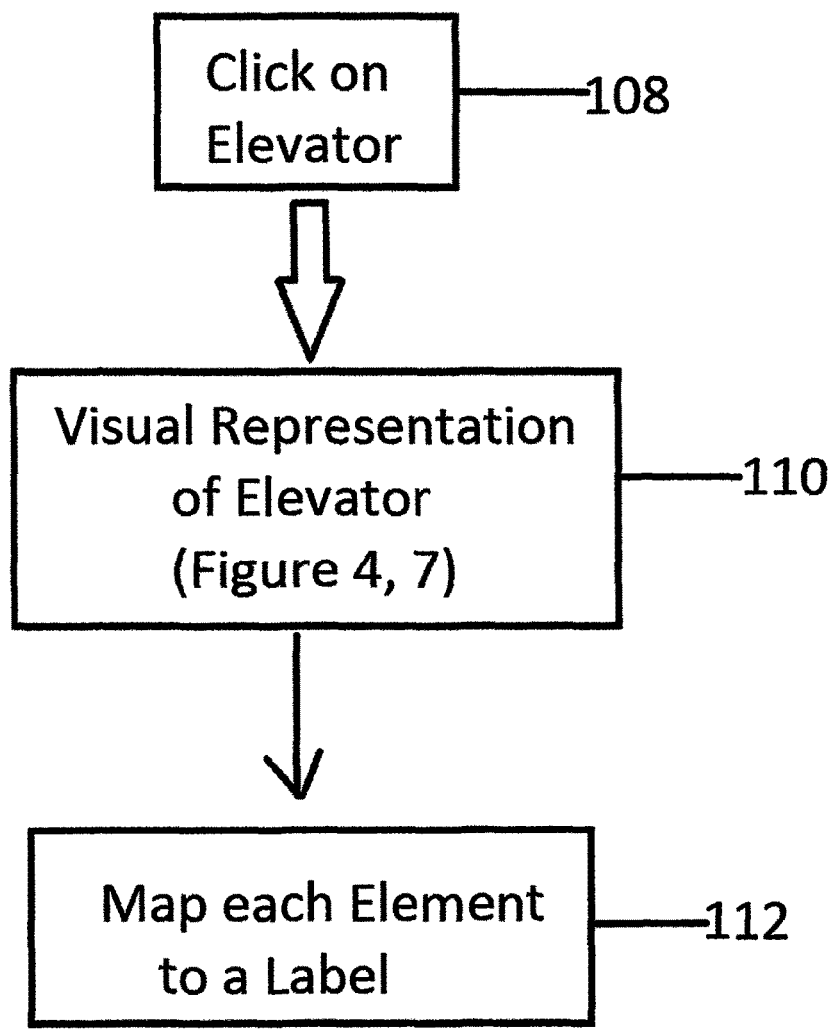
FIG. 11 illustrates a block diagram once elevator is selected to be displayed form CAD software.
Figure 12:
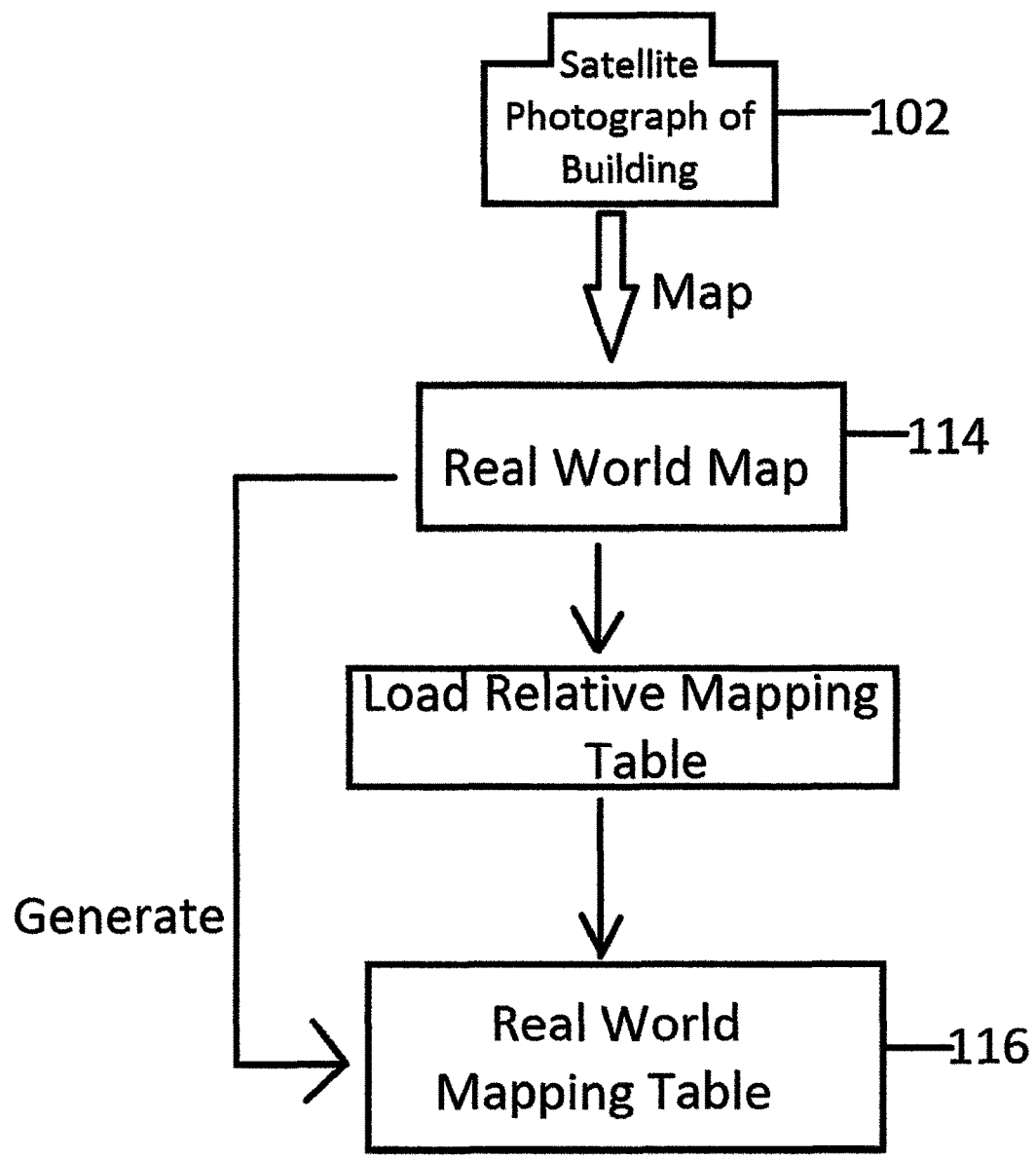
FIG. 12 illustrates a block diagram of overall software flow from GIS.

Referring to FIG. 10, 11, 12 in the system a building (102) maps onto a two dimensional floor plan representation at block (104) which is loaded into computer aided software (106) that generates a visual relative representation of the building at block (108) which is depicted in FIG. 9. Utilizing computer display in FIG. 9, a user clicks on elevator which generates the visual representation as shown in FIGS. 4 and 7 wherein each element is map to a label at block (112) as represented in FIG. 13. Then building (102) is located on the real world map at block (114) and the representation in FIG. 13 is downloaded into the geographical software that generates the real world mapping table at block (116) illustrated in FIG. 14.

Figure 1:
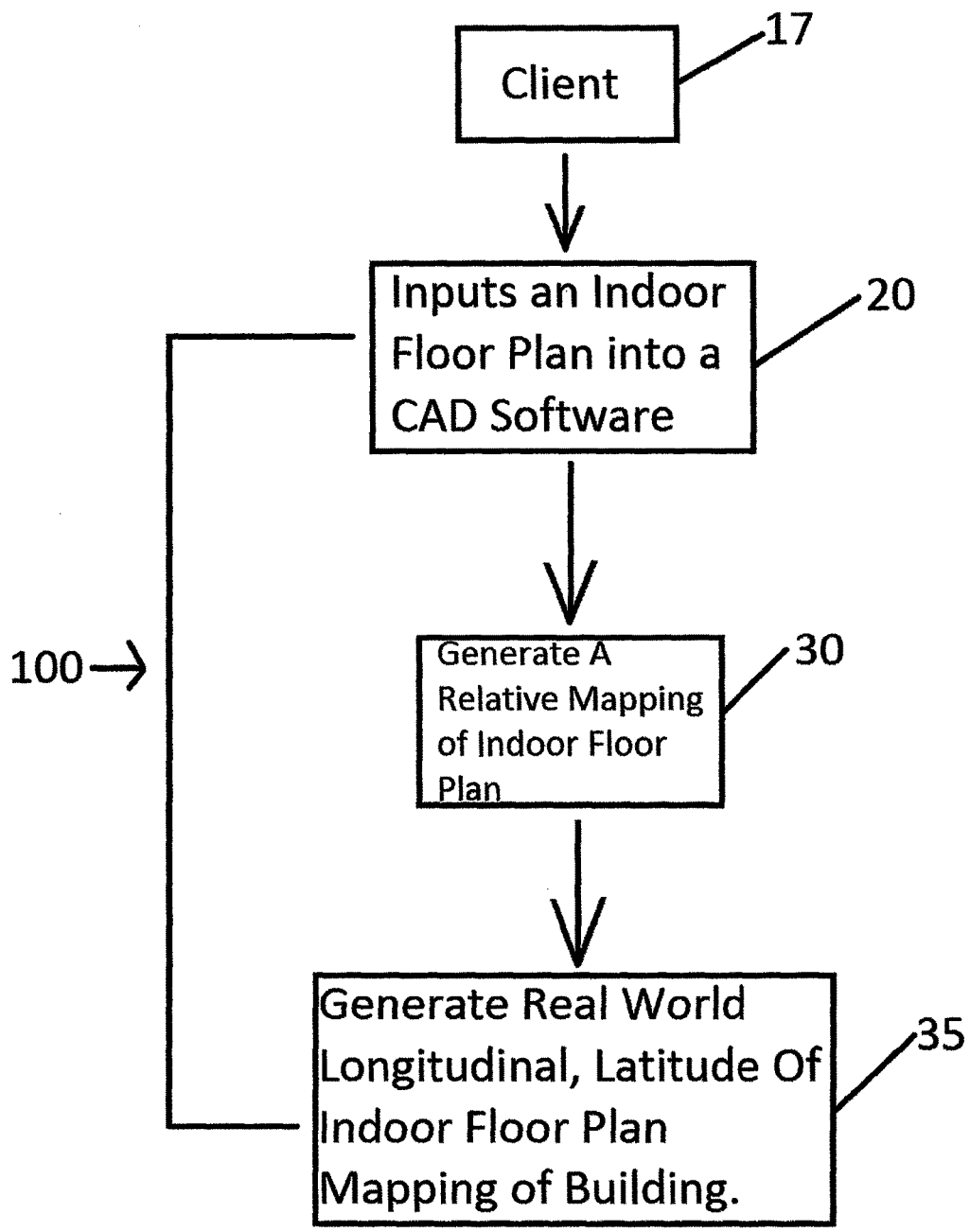
FIG. 1 depicts a system according to an embodiment of the present invention, generating the longitude and latitude of a building infrastructure.
Figure 8:
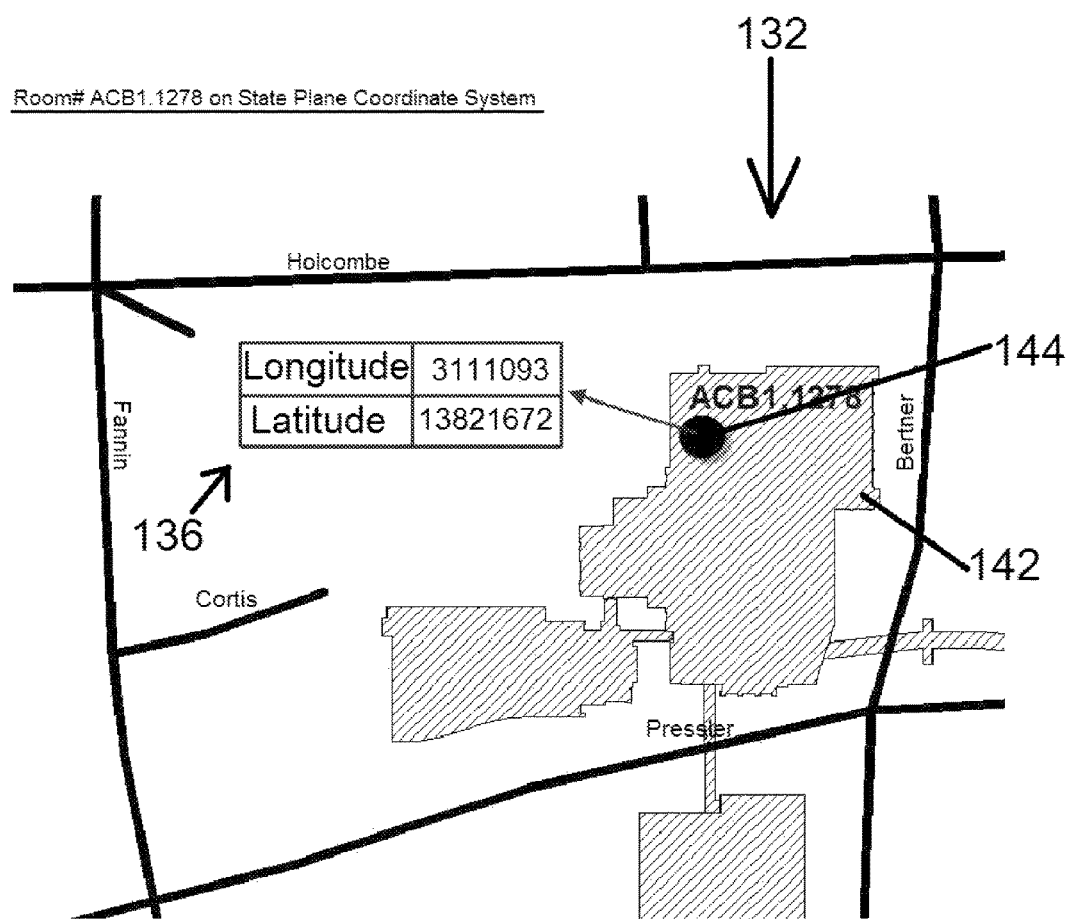
FIG. 8 illustrates an example of rendering of an indoor floor plan in real world format.

FIG. 1 illustrates the overall steps involved in the system (100) wherein user (17) at block (20) generates a digital representation of a floor plan as designated as (105) depicted in FIG. 4. Then at block (30) in FIG. 1 the system maps the floor plan in FIG. 4 to its real world longitude and latitude position as designated in FIG. 5. At block (35) in FIG. 1, the system renders the building as depicted in FIG. 8. As shown in FIG. 7, at block 134, room# ACB1.1278 with x-252, y-417 maps to longitude-3111093, latitude-13821672 (136) identified in FIG. 7. Then, room# ACB1.1278 is shown rendered relatively using geometry (138) placed upon building (130) at dot (144). FIG. 8, then shows room# (ACB1.1278) rendered on real world map (132) with building location (142) as dot (144).

At step (30) in FIG. 1, each element or unit on a particular floor is mapped to a relative longitude and latitude position as shown in FIG. 4 and can be generated in layers as shown in FIG. 9. Then, the relative longitude and latitude is mapped onto the longitude and latitude of the real data objects on the earth and imported into a database as shown in FIG. 14. Finally, the relative digital representation of the building floor plan is mapped onto accurate longitude and latitude positions.

Figure 2:
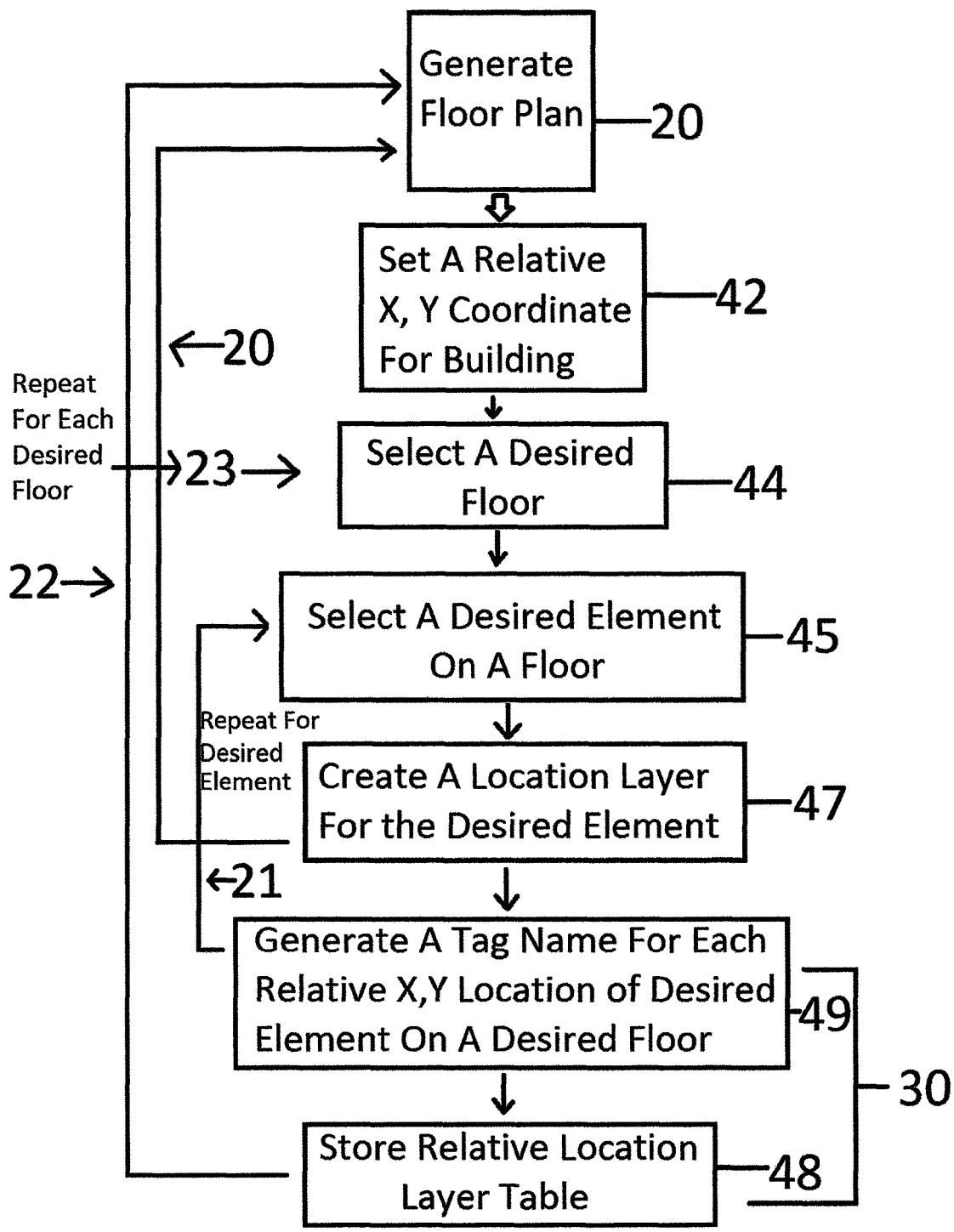
FIG. 2 is a flow chart illustrating a method for generating a relative position for each unit on a floor plan.

The mapping system (100) utilizes a computer that is programmed to perform the following functions. Referring to FIG. 2 at step (20), the first main function of the system is to generate a digital representation of the three dimensional floor plan which involves the following steps as depicted in FIG. 2.

a. At Step (42), the system is set to a relative (x-0, y-0) Cartesian position for the building which is designated as start position. This position is used to map every element of the building. In this example, this is building Q in FIG. 4.

b. At Step (44), the system sets a relative position for each selected floor based upon the relative Cartesian positions of the building. In this example, Unit R1, R2, and R3 in Table (105) in FIG. 4 positions are set.

c. At Step (45) the system is programmed to generate a three dimensional visual representations of each floor of the building from the relative start position as shown in FIGS. 4 and 7.

d. At Step (47) the system is programmed to generate a data object for each element in the floor plan relative to its x, y position from the start position depicted in FIGS. 4 and 7 (i. e. room, elevator, exit, camera and other elements). In this example elevator floor plan shown FIG. 4 and room# ACB1.1278 illustrated in FIG. 7.

e. At Step (47) the system is programmed to map the x, y relative position for each element to a tag name. In this system a location layer is created corresponding to each desired element location to be determined. The relative x,y location of each desired element is generated and a tag name is mapped to the relative x,y location. As shown in FIG. 4 tag names R1, R2, and R3 are designated elevators and in FIG. 7 ACB1.1278 is designated as a room.

f. At Step (49) the system is programmed to generate a table representation with tag names as shown in FIG. 13 with their corresponding relative x, y positions. At step (21) repeat for each designed location elevation on a floor, at step (22) repeat for each designed floor of the building, and at step (23) repeat for each desired floor.

Figure 3:
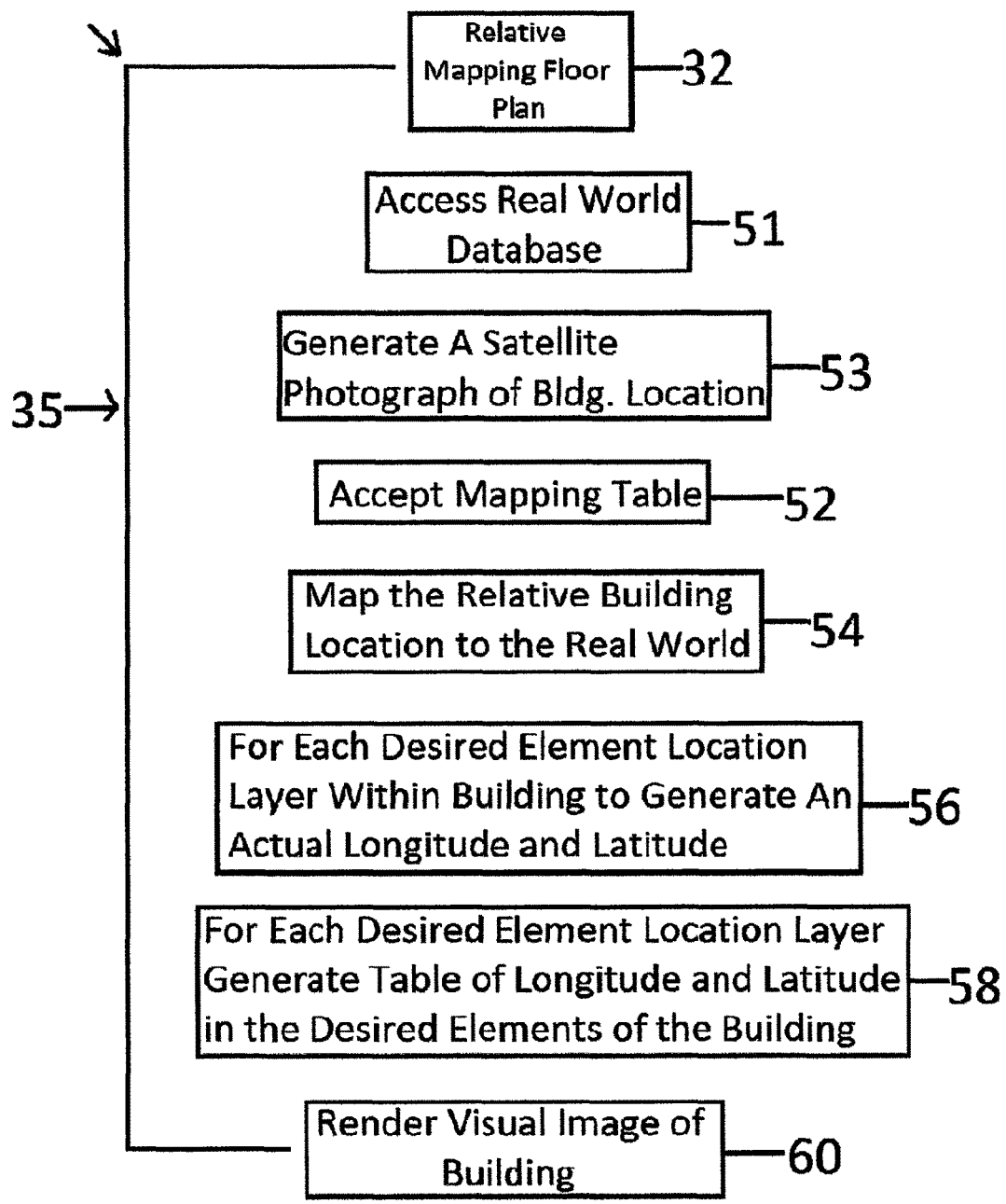
FIG. 3 is a flow chart illustrating a method of mapping the relative position for each unit onto its actual longitude and latitude position.

The second main function of the system is to generate a real world mapping of the floor plan which involves the following steps as depicted in FIG. 3.

a. At block (51) the system is programmed to access geographic longitude and latitude positions on the earth surface from the real world database (25) as depicted in FIG. 1. At block (53) the system is programmed to generate a satellite photograph of the building location.

b. At block (52) the system is programmed to access the relative mapping table generated at block 30 which is the data shown in FIG. 13.

c. At Step (52) that system is programmed to determine the real world longitude and latitude of the building surface from the real world database (25). Once the relative points are converted into longitude and latitude the system rotates the building visually until it maps from the relative positions into its real world longitude and latitude positions, as shown in FIG. 8.

d. At Step (54) the system is programmed to map the relative start position onto the real longitude and latitude of the building surface from the real world database (25) depicted in FIG. 8. The system is programmed to create an adjusting scale for the building wherein the building is rotated or moved to a specific angle position on the real world map. Once the angle position is determined, the building is scaled to the real world. This adjustment is calculated and applied to the relative table to calculate the real world mapping.

e. At Step (56) the system is programmed to create a data object for each tag name of the building mapping the relative position to the actual longitude and latitude surface from the real world database (25) into the Mapping table database (27) as shown in FIG. 14.

f. At Step (60) the system is programmed to visually render as depicted FIG. 5 the entire indoor floor plan based upon the longitude and latitude from the table generated at step (58) as depicted in FIGS. 7 and 8. The system can depict a point, line between two points, or curve between two points.

What is claimed is:

1. A method for utilizing a processor, a display and a non-transitory computer storage media, the method to create an indoor floor map of a building comprising the step of:
generating a real-world objects database stored within the non-transitory computer storage media containing a plurality of longitude and latitude positions for real world elements in a locality where the building is located, wherein a satellite is utilized to survey a plurality of real world objects of the earth surface;
the processor creating a relative x and a relative y position for the building having a plurality of visual elements, selecting a subset of visual elements from the plurality of visual elements for a desired floor in the building and implementing a mapping system which interfaces with the satellite to receive a plurality of longitude and latitude information through a GPS satellite receiver that is imported into the real-world objects database;
for each desired floor in the building generating a three-dimensional top plan view on the display showing the subset of visual elements, the satellite generates a satellite photograph of the building location;
for each element within the subset of visual elements generating a correlate x position and a correlate y position based upon the relative x position and the relative y position of the building, the satellite captures, collects and stores the earth surface information and transmits that information to be stored as a plurality of digital data objects in the database;
for each element within the subset of visual elements generating a name tag which represents the correlate x position and the correlate y position of the building;
generating a correlating database structure containing a record which represent each element within the subset comprising the name tag and the correlate x position and the correlate y position;
based upon the relative x and relative y position for the building, generating a real world longitude and latitude position for the building in that locality;
based upon the real-world longitude and latitude position of the building determine an adjusting scale;
adjusting the record containing the relative x and relative y position in the correlating database to a real-world longitude and latitude position for the building using the adjusting scale; and
generating upon the display a visual representation of the desired floor of the building using the real-world longitude and latitude position.

2. The method of claim 1, further comprising generating a three-dimensional top plan view of the desired floor showing the subset of the visual elements based upon the name tag and the relative x and y position.

3. The method of claim 2, further comprising generating the three-dimensional top plan view of the desired floor showing the real-world longitude and latitude position.

4. The method of claim 3, further comprising generating the three-dimensional top plan view of the desired floor showing the subset of the visual elements based upon the name tag and the real-world longitude and latitude position.

5. The method of claim 1, wherein the subset of visual elements is selected from the group consisting of a door, a wall, an elevator, a camera, and an exit door.

6. The method of claim 1, wherein the subset of visual elements is selected from the group consisting of a point, a curve, and a line.

7. A non-transitory computer storage media, having instructions stored thereon which, when executed, execute a method comprising the steps of:
generating a real-world objects database stored within the non-transitory computer storage media containing a plurality of longitude and latitude positions for real world elements in a locality where the building is located, wherein a satellite is utilized to survey a plurality of real world objects of the earth surface;
the processor creating a relative x and a relative y position for the building having a plurality of visual elements, selecting a subset of visual elements from the plurality of visual elements for a desired floor in the building and implementing a mapping system which interfaces with the satellite to receive a plurality of longitude and latitude information through a GPS satellite receiver that is imported into the real-world objects database;
for each desired floor in the building generating a three-dimensional top plan view on the display showing the subset of visual elements, the satellite generates a satellite photograph of the building location;
for each element within the subset of visual elements generating a correlate x position and a correlate y position based upon the relative x position and the relative y position of the building, the satellite captures, collects and stores the earth surface information and transmits that information to be stored as a plurality of digital data objects in the database;
for each element within the subset of visual elements generating a name tag which represents the correlate x position and the correlate y position of the building;
generating a correlating database structure containing a record which represent each element within the subset comprising the name tag and the correlate x position and the correlate y position;
based upon the relative x and relative y position for the building, generating a real world longitude and latitude position for the building in that locality;
based upon the real-world longitude and latitude position of the building determine an adjusting scale;
adjusting the record containing the relative x and relative y position in the correlating database to a real-world longitude and latitude position for the building the adjusting scale; and
generating upon the display a visual representation of the desired floor of the building using the real-world longitude and latitude position.

8. The non-transitory computer storage media of claim 7, further comprising generating a three-dimensional top plan view of the desired floor showing the subset of the visual elements based upon the name tag and the relative x and y position.

9. The non-transitory computer storage media of claim 7, further comprising generating a three-dimensional top plan view of the desired floor showing the real-world longitude and latitude position.

10. The non-transitory computer storage media of claim 7, further comprising generating the three-dimensional top plan view of the desired floor showing the subset of the visual elements based upon the name tag and the real-world longitude and latitude position.

11. The non-transitory computer storage media of claim 7, wherein the subset of visual elements is selected from the group consisting of a door, a wall, an elevator, a camera, and an exit door.

12. The non-transitory computer storage media of claim 7, wherein the subset of visual elements is selected from the group consisting of a point, a curve, and a line.

* * * * *